United States Patent [19]

Schmitt et al.

[11] Patent Number: 5,573,315
[45] Date of Patent: Nov. 12, 1996

[54] SYSTEM FOR PREVENTING SLIP OF DRIVEN WHEELS

[75] Inventors: Johannes Schmitt, Markgröningen; Ralf Donath, Ditzingen, both of Germany

[73] Assignee: Robert Bosch GmbH, Stuttgart, Germany

[21] Appl. No.: 256,188

[22] PCT Filed: Oct. 12, 1993

[86] PCT No.: PCT/DE93/00965

§ 371 Date: Jun. 30, 1995

§ 102(e) Date: Jun. 30, 1995

[87] PCT Pub. No.: WO94/10013

PCT Pub. Date: May 11, 1994

[30] Foreign Application Priority Data

Oct. 24, 1992 [DE] Germany .......................... 42 36 004.8

[51] Int. Cl.[6] ..................................... B60T 8/00
[52] U.S. Cl. .......................... 303/141; 303/142; 180/197; 364/426.02
[58] Field of Search ..................... 303/139, 141, 303/142, 145; 364/426.01–426.03; 180/197

[56] References Cited

U.S. PATENT DOCUMENTS

| | | | |
|---|---|---|---|
| 4,643,485 | 2/1987 | Leiber . | |
| 4,765,430 | 8/1988 | Schulze et al. | 180/197 |
| 4,766,972 | 8/1988 | Takata et al. | 180/197 |
| 4,939,656 | 7/1990 | Hoashi et al. | 364/426.02 |
| 4,946,015 | 8/1990 | Brouslski et al. | 192/1.23 |
| 4,987,966 | 1/1991 | Fujita | 303/141 X |
| 5,164,902 | 11/1992 | Kopper et al. | 303/141 X |
| 5,366,282 | 11/1994 | Schmitt et al. | 303/141 |

*Primary Examiner*—Robert J. Oberleitner
*Assistant Examiner*—Peter M. Poon
*Attorney, Agent, or Firm*—Felfe & Lynch

[57] ABSTRACT

An ASR is described which actuates the brakes in the case of spin. A maximum braking torque which depends on the drive torque is specified here in order to prevent strangling of the engine by the ASR operation.

9 Claims, 1 Drawing Sheet

SYSTEM FOR PREVENTING SLIP OF DRIVEN WHEELS

BACKGROUND OF THE INVENTION

The invention relates to a drive slip control system of the type in which brake pressure is fed to the driven wheels on the appearance of drive slip. A system of this type is disclosed in DE 36 34 240, to which U.S. Pat. No. 5,164,902 corresponds.

The variation in brake pressure which is proportional to the drive, as achieved by the invention, avoids an excessive brake pressure which is based on the slip and can stall the engine. Where the invention is applied, it may be possible to dispense with influencing the engine torque.

BRIEF DESCRIPTION OF THE DRAWING

The sole FIGURE is a diagram of the inventive system.

PREFERRED EMBODIMENT

Figure 1:
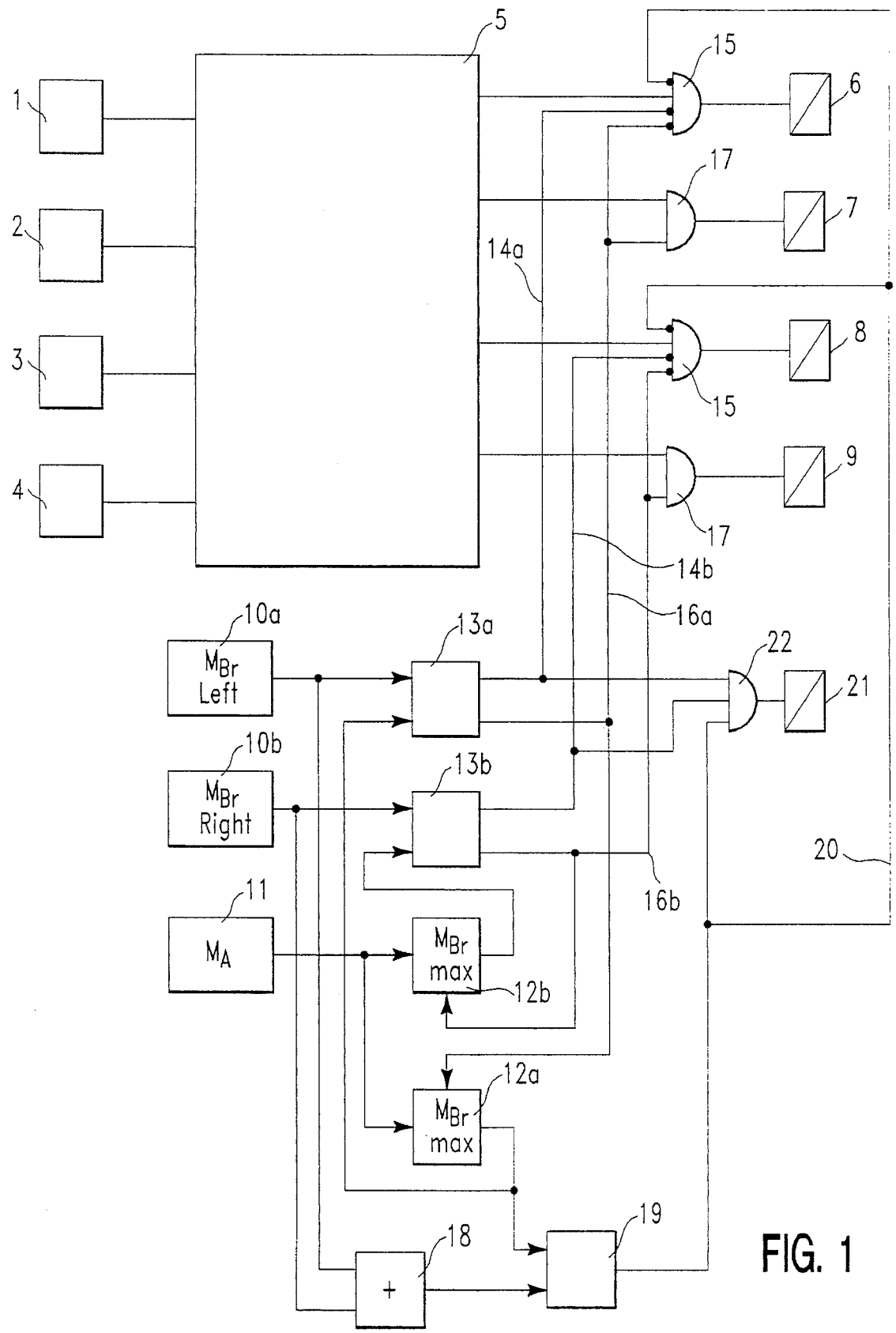

In FIG. 1 of the drawing, the speed sensors 1 and 2 are associated with the non-driven wheels of a vehicle are and the sensors 3 and 4 are associated with the driven wheels. When the driven wheels tend to spin, a control unit 5 generates brake pressure control signals from the signals of the sensors 1 to 4 and these control signals are supplied to the inlet valves 6 and 8 and the outlet valves 7 and 9 associated with the wheel brakes of the driven wheels. If no valve is activated, the pressure is kept constant. If an inlet valve 6 or 8 is activated, a pressure source is connected to a wheel brake and if an inlet valve and an outlet valve are activated, pressure reduction takes place at the wheel brake.

In order to avoid an excessively high brake pressure being fed in and to avoid the engine being stalled by the drive-slip control system, the arrangement now to be described is provided. In computational circuits 10a and 10b, the braking torques $M_{Br}$ for the two driven wheels are determined from a constant K, which is specific to the vehicle, and the number of pressure build-up and reduction pulses which has been determined according to DE 41 23 783, which corresponds to PCT/DE 92/00503 designating the United States, incorporated herein by reference. A computational circuit 11 correspondingly determines the drive torque $M_A$ from the engine rotational speed, the gearbox transmission ratio, the throttle butterfly angle and mass volumetric efficiency parameters.

The corresponding relationships are $M_{mot}$ determined from a characteristic $M_A = M_{mot} \times i_{ges} \times \eta - \theta_{ges} \times \dot{w}$ $M_{Br} = P \times A_w \times r = P \times k$ In these relationships, $A_w$ is the effective area, r the effective radius, P the pressure, $\theta_{ges}$ the moment of inertia of the drive train, $\dot{w}$, the angular acceleration and $\eta$ the efficiency (for example 0.8).

The braking torque must not exceed the drive torque. In consequence, it is possible to determine a maximum braking torque variation $M_{Br\ max}$ which permits no braking torque at idling rotational speed and permits an increase in the braking torque as the drive torque increases.

The maximum brake pressure is only achieved at a drive torque which is required to drive away on a slope which has been determined or with a corresponding acceleration. This maximum braking torque $M_{Br\ max}$ is defined as follows:

$$M_{Br\ max} = \frac{M_A}{K_2} - K_1$$

In this, $K_1$ and $K_2$ are constant; $K_1$ has a value which corresponds to a drive torque typical of drive-slip control systems on slopes and which is intended to ensure that there is more drive torque than braking torque (for example 200 Nm) and which takes on a different value in the case of select-high operation (differential lock function); $K_2$ determines the degree of increase in the brake pressure, is selected to suit the specific gear and engine and is, for example, 5 Nm.

The empirically determined variation of $M_{Br\ max}$, as explained above, is stored in blocks 12a and 12b, i.e. the blocks 12 provide the maximum braking torque $M_{Br\ max}$ applicable to the particular drive torque $M_A$. The braking torques $M_{Br}$ determined are compared with the maximum braking torque $M_{Br\ max}$ in comparators 13a and 13b and an output signal is generated on one of the lines 14a and 14b whenever $M_{Br}$ of one of the wheels reaches the value of $M_{Br\ max}$. The corresponding AND gate 15 is therefore shut off and the pressure reached is held.

If the braking torque $M_{Br}$ exceeds the maximum braking torque because, for example, $M_{Br\ max}$ becomes smaller, a signal is additionally generated on one of the lines 16a or 16b and this signal activates the corresponding outlet valve 7 or 9 by means of the OR gate 17 and, by this means, reduces pressure. Because the block 12a or 12b is also activated with the output signal on the line 16a or 16b and this block 12a or 12b then generates an output signal $M_{Br\ max} - K_3$, pressure is reduced beyond the limit $M_{Br\ max}$ to correspond with the selection of the constant $K_3$. The constant $K_3$ therefore generates a hysteresis and reduces vibrations and oscillatory switching (for example 2). When the value $M_{Br\ max} - K_3$ has been reached, pressure build-up can again be effected by the control unit 5.

The control described up to this point is effective if select-high operation is present, i.e. if one wheel tends to spin (μ-split). If both wheels threaten to spin (select-low), the braking torque at both wheels is limited. For this purpose, the braking torques of the blocks 10a and 10b are added in a block 18 and the sum is compared with the maximum possible braking torque $M_{Brmax}$ in a comparator 19. If the sum tends to exceed this maximum torque, further pressure build-up at both wheels is prevented by means of the line 20. Here again, as shown in the case of select-high, pressure is reduced by means of a second output of the comparator 19 whenever the braking torque is less than $M_{Brmax} - K_3$. For reasons of simplicity, this is not shown in FIG. 1.

Alternatively or additionally, the engine torque can be increased when the maximum permissible braking torque is reached at one of the brakes or when the braking torque sum reaches this torque. This is indicated by means of an actuator 21 with an upstream OR gate 22. In the case of select-high, for example, it is only possible to increase the engine torque and, in the case of select-low, it is only possible to limit the braking torque.

The elements 12a and 12b can contain a time element which reduces the permissible $M_{Brmax}$ after a time in order to protect the brake. In the calculation of $M_{Brmax}$, it is also possible to permit the inclusion of a weighting factor which is calculated from the ratio of the two control deviations BRA (left/right) as follows:

$$F = \frac{BRAx}{BRAx + BRAy} \quad BRAx > BRAy$$

It is useful to permit only select-low control from a speed of, for example, 35 km/h and/or of, for example, 15 km/h when traveling round a curve.

The engine torque is usefully only increased when pressure is limited to p=0 bar on one wheel.

We claim:

1. Drive slip control system for a vehicle having at least two driven wheels, an engine which provides drive torque $M_A$ for said driven wheels, and brake means which provide brake torque $M_{Br}$ for said driven wheels, said system comprising means for determining when drive slippage of a driven wheel occurs, ASR means responsive to said drive slippage for producing braking torques at the driven wheels, means for determining the braking torques $M_{Br}$ at the driven wheels, means for determining the drive torque $M_A$ provided by the engine, means for determining a maximum braking torque $M_{Brmax}$ in dependence on said engine torque $M_A$, where $M_{Brmax}=0$ when $M_A<0$ and $M_{Brmax}$ increases as $M_A$ increases, means for at least one of (1) limiting the braking torques produced by said ASR means to $M_{Brmax}$ when $M_{Br}$ exceeds $M_{Brmax}$, and (2) increasing the drive torque $M_A$ when $M_{Br}$ exceeds $M_{Brmax}$.

2. Drive slip control system as in claim 1 wherein said system comprises means for reducing the braking torques produced by said ASR means to $M_{Brmax}-K_3$ when $M_{Br}$ exceeds $M_{Brmax}$, $K_3$ being a constant.

3. Drive slip control system as in claim 1 comprising means for forming the sum of the braking torques at the driven wheels, and means for at least one of (1) limiting the braking torques produced by said ASR means at both driven wheels to $M_{Brmax}$ when said sum exceeds $M_{Brmax}$, and (2) increasing the drive torque $M_A$ when said sum exceeds $M_{Brmax}$.

4. Drive slip control system as in claim 3 comprising means for increasing the drive torque $M_A$ when $M_{Br}$ at one wheel exceeds $M_{Brmax}$, and means for limiting the braking torques produced by said ASR means to $M_{Brmax}$ when said sum exceeds said maximum braking torque $M_{Brmax}$.

5. Drive slip control system as in claim 4 wherein said means for increasing drive torque is only effective when said means for limiting braking torque is not effective.

6. Drive slip control system as in claim 1 wherein said means for determining a maximum braking torque $M_{Brmax}$ reduces $M_{Brmax}$ as a function of time.

7. Drive slip control system as in claim 1 further comprising means for determining said vehicle speed, wherein said means for at least one of (1) limiting the braking torques and (2) increasing the drive torque $M_A$ is not effective when the vehicle speed exceeds a predetermined speed.

8. Drive slip control system as in claim 1 wherein said means for determining a maximum braking torque $M_{Brmax}$ determines $M_{Brmax}$ according to $M_{Brmax}=M_A/K_2-K_1$, wherein $K_1$ and $K_2$ are constants.

9. Drive slip control system according to claim 8 further comprising means for determining the roadway slope, at least one of $K_1$ and $K_2$ depending on said roadway slope.

* * * * *